United States Patent [19]
Landry et al.

[11] Patent Number: 5,414,981
[45] Date of Patent: May 16, 1995

[54] SUGAR CANE BILLETING CUTTER

[75] Inventors: Walter J. Landry, Jeanerette; John W. Angers, New Iberia, both of La.

[73] Assignee: Agronomics, Inc., Jeanerette, La.

[21] Appl. No.: 314,265

[22] Filed: Sep. 30, 1994

Related U.S. Application Data

[62] Division of Ser. No. 186,179, Jan. 25, 1994.

[51] Int. Cl.$^6$ .................................. A01D 45/00
[52] U.S. Cl. ................................. 56/249; 56/192
[58] Field of Search ............... 56/229, 249, 255–259, 56/289, 293–299, 156, 192, 198

[56] References Cited

U.S. PATENT DOCUMENTS

| | | | |
|---|---|---|---|
| 4,502,267 | 3/1985 | Klinner | 56/192 X |
| 4,633,656 | 1/1987 | Willinger | 56/295 X |
| 4,722,174 | 2/1988 | Landry et al. | 56/192 X |
| 5,303,533 | 4/1994 | Caillouet | 56/192 X |

*Primary Examiner*—Michael Powell Buiz
*Attorney, Agent, or Firm*—Jacobson, Price, Holman & Stern

[57] ABSTRACT

A cane harvester including sugar cane lifting, gathering and severing structure operative to engage, lift and sever the tops and bottoms of cane oriented in a row along which the harvester is advanced with the cut cane subsequently being conveyed in an upright position and then discharged rearwardly and downwardly, in a rearwardly and upwardly inclined position, into a forwardly and upwardly opening cutter assembly operative to simultaneously sever the cane into billet lengths at points spaced predetermined distances therealong with leaf portions of the cane being simultaneously severed at the same points spaced along the cane to thereby provide cleanly cut cane billets having had a majority of the leaf portions severed therefrom and thus substantially ready for processing in the manufacture of cane sugar.

8 Claims, 5 Drawing Sheets

SUGAR CANE BILLETING CUTTER

This is a divisional of application Ser. No. 08/186,179 filed Jan. 25, 1994.

BACKGROUND OF THE INVENTION

1. Field of the Invention

The present invention relates generally to a green sugar cane billeting combine and more specifically to a combine or harvester for lifting (righting) recumbent sugar cane, gathering, two upright sugar cane and chopping or shredding the immature top portions of the sugar cane, cutting the lower ends from the sugar cane and thereafter simultaneously cutting successive sugar cane stalks into short length billets along cutting zones spaced therealong in which zones leaf portions of the cut cane stalks are also cut to thereby cut majority portions of the leaves from the cane. A conveyor is provided for receiving the cane billets and conveying the cane billets to a discharge point, cut leaf portion separating structure being provided closely upstream from the discharge point of the conveyor for separating cut leaf portions from the cane billets.

2. Description of Related Art

Various different forms of combines and harvesting apparatus including some of the general structural and operational features of the instant invention heretofore have been provided. Examples of these previously known structures are disclosed in U.S. Pat. Nos. 857,451, 3,434,271, 3,601,957, 3,670,481, 4,924,662, 5,092,110 and my prior U.S. Pat. No. 4,722,174.

However, these previously known combines and harvesters do not include structure specifically adapted to harvest green sugar cane in a manner cutting the tops and bottoms therefrom effecting removal of a large majority of the leaves from the cane and also cleanly cutting the cane into billets, all without dirt contamination of the cane from the ground.

SUMMARY OF THE INVENTION

The combine of the instant invention has been specifically designed to harvest green sugar cane in a manner effective to initially gather, lift and cut the tops and bottoms from sugar cane, which procedural steps are conventional as disclosed in my prior U.S. Pat. No. 4,722,174.

However, most sugar cane harvesters thereafter deposit the cut sugar cane onto the ground and the cane is then picked up from the ground, the cut cane being contaminated with dirt upon being deposited upon the ground and during the process of being subsequently picked up therefrom.

Most existing equipment utilized for picking cut cane from the ground causes substantially full length aggressive contact of the cane with the ground thereby affording abundant opportunity to deliver soil into the transport container with the cane.

The combine of the instant invention avoids soil contact after cutting the cane from the ground. Further, the combine of the instant invention may be expected to deliver soil free billets to the cane transporter and to thereby not only enable substantially clean cane to be delivered for processing but also preventing appreciable quantities of top soil from being removed from the field.

Still further, the combine of the instant invention further provides cane to the cane transport which is already cut into billets and has had a large majority of the weight of cane leaves removed therefrom.

Another very important feature of the combine of the instant invention is that the cane is cut into billets by a cutting process which effects only a single quick and clean cut at each location in which the cane is cut into billets, this type of clean cut not being possible on existing combines which use rotating blades working against each other.

An ancillary feature of the instant invention is that the laterally spaced cutting blades utilized for cutting the cane into billets are spaced apart approximately one-half the length of cane billets used for seed purposes (in order to cut more leaf portions from the cane) and at least every other cutting blade is removably supported from the combine in order that the combine being used in harvesting may supply seeding billets.

The main object of this invention is to provide a green sugar cane billeting combine which will be capable of harvesting green sugar cane and depositing the harvested sugar cane directly into an attendant cane transport without soil contamination of the cut cane.

Another object of this invention is to provide a cane harvester including structure for cutting the cut and harvested cane into short length billets to thereby facilitate conveying of the harvested sugar cane into an attendant transport.

Yet another object of this invention is to provide a green cane combine or harvester including structure that will automatically cut a major portion of the leaves from the cane as the latter is being cut into billets and prior to conveying of the billets into an attendant transport.

A further object of this invention, in accordance with the immediately preceding object, is to provide a cane harvester which will be capable of separating substantially all of the cut leaf portions from the cane billets prior to the latter being discharged into an attendant cane transport.

Still another important object of this invention is to provide a green sugar cane harvester in accordance with the preceding objects and which will be operative to cleanly cut the cane into billets of a length approximately one-half the length of seeding billets and wherein the harvester may be readily modified to cut the cane, when desired, into full length seeding billets.

A final object of this invention to be specifically enumerated herein is to provide a cane harvester in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like part throughout.

DETAILED DESCRIPTION OF THE INVENTION

Figure 1:
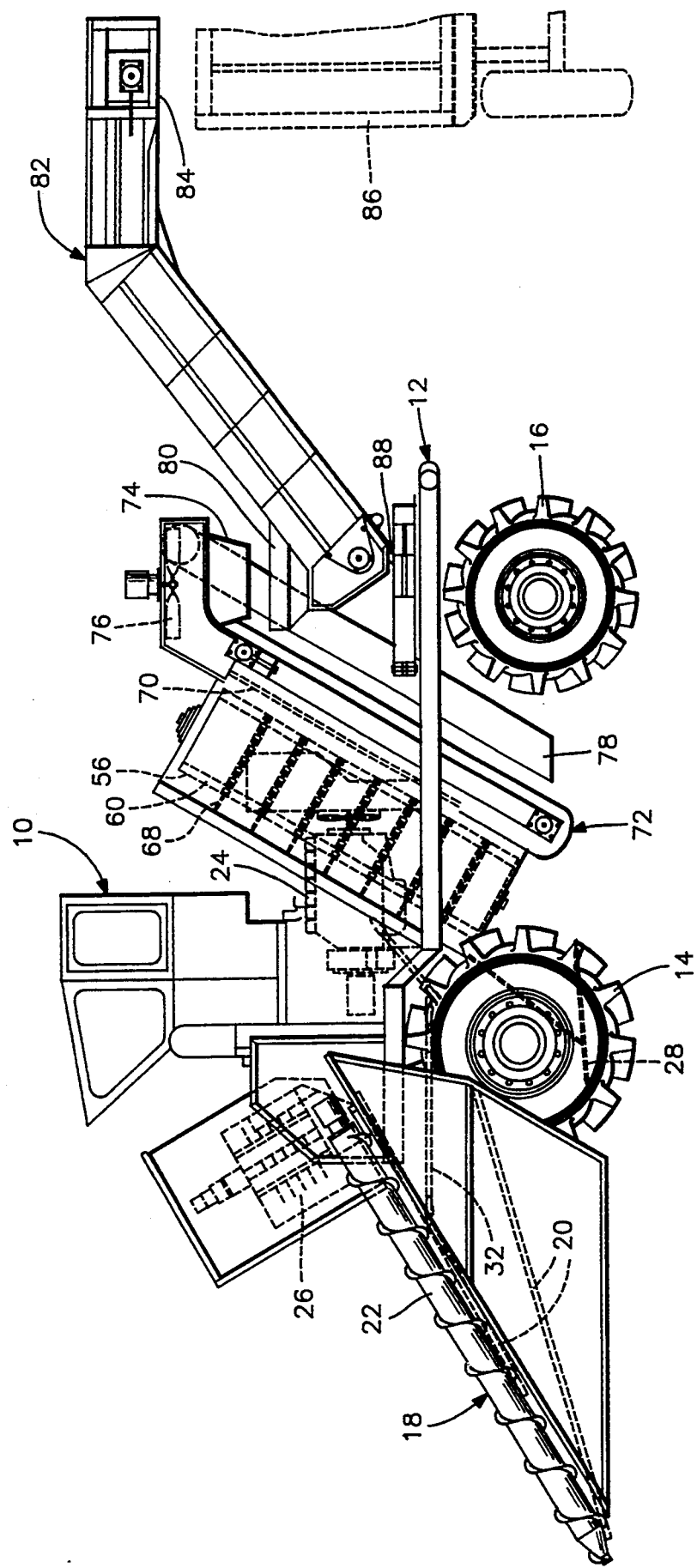
FIG. 1 is a side elevational view of the combine of the instant invention with the cane topping, bottom cutting blades and billeting blade structure illustrated in phantom lines and the discharge conveyor for the combine illustrated in transport position.
Figure 2:
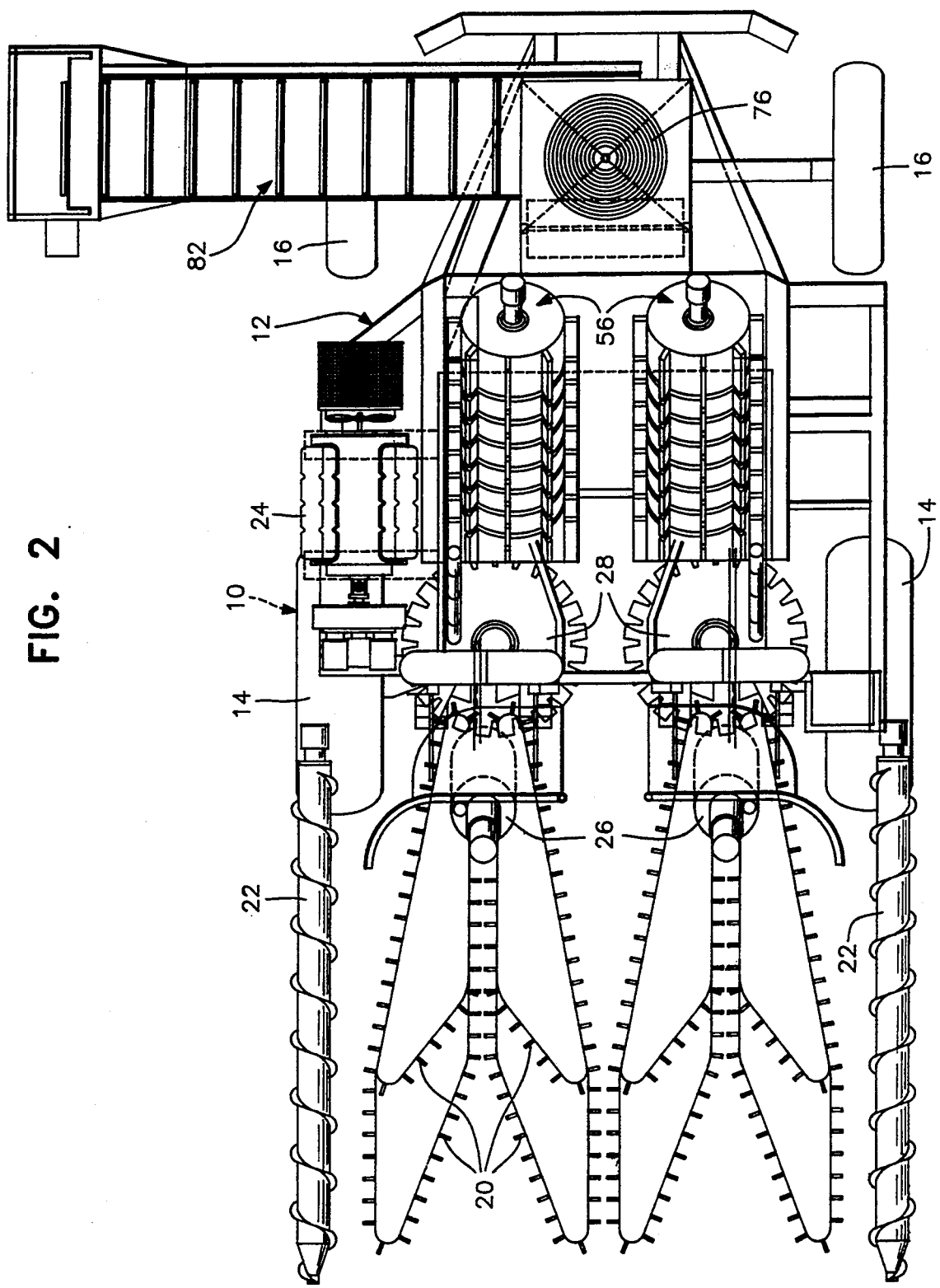
FIG. 2 is a schematic top plan view of the cane combine with the billet discharge conveyor thereof in a first laterally directed operative position.

Referring now more specifically to the drawings the numeral 10 generally designates the green sugar cane billeting combine of the instant invention. The combine 10 includes a wheeled chassis or frame referred to in general by the reference numeral 12 having front opposite driving wheels 14 and rear opposite side steering wheels 16. The front end of the chassis or frame 12 includes a vertically adjustable cane righting and gathering head assembly 18 incorporating sticker chains 20 and row divider scrolls 22 of substantially conventional design and driven in any convenient manner (not shown) from a prime mover 24 supported amidships on the right side of the frame 12. Also, the combine 10 comprises a two row combine and includes cane topping assemblies 26 similar to that disclosed in my prior U.S. Pat. No. 4,722,174 for cutting the immature tops from green cane being harvested and also a pair of lower cutting blades 28 for cutting the bottoms from cane being harvested.

As the cane being harvested is gripped by the chains 20 and moved rearwardly through the assemblies 26 and past the blades 28 it is supported in substantially upright position and then is discharged to a conveyor assembly referred to in general by the reference numeral 30 which extends along the chassis or frame 12 and forwardly overlaps the rear ends of the chains 20. Each conveyor assembly 30 includes first and second front and rear #80 sticker chains 32 and 34, the first or forward sticker chain 32 for each row of cane being harvested including an active horizontal reach 36 thereof which opposes and generally parallels the generally horizontal forward end 38 of an opposing and resiliently mounted front to rear extending abutment bar 40, each sticker chain 34 including a rearwardly and upwardly inclined active reach 42 which opposes the rearwardly and upwardly inclined rear end 44 of the opposing and resiliently mounted abutment bar 40. Accordingly, as may be seen from a comparison of FIGS. 1, 2, 5 and 6, after the cane 48 is righted gathered and elevated by the chains 20, it is engaged by the sticker chains 32 and moved rearwardly between the reaches 36 and the forward ends 38 of the abutment bar 40. Then, the cane 48 is transferred from the sticker chain 32 to the sticker chain 34 and conveyed rearwardly and upwardly between the reaches 42 and the rear ends 44 of the abutment bar 40.

During rearward and upward conveying of the cut cane 48, the lower ends of the cut cane 48 are engaged by a horizontal, transverse and proportional speed driven kicker drum 50 having radially outwardly projecting and circumferentially spaced blades 52 thereon for engaging and upwardly displacing the cane 48 as well as causing, in conjunction with the sticker chains 34, the cut cane 48 to be inclined rearwardly before being allowed to fall downwardly and rearwardly by gravity, while still inclined, into forwardly and upwardly opening inclined chopper drum assemblies 56.

The chopper drum assemblies 56 are proportionally rotary driven in any convenient manner from the prime mover 24 (as are the chains 32 and 34) and each chopper drum assembly 56 includes circumferentially spaced flights of radially aligned and outwardly projecting radial plane paddles 58 spaced along the length of the midportion of the corresponding drum assembly 56, each drum assembly 56 also including upper circumferentially spaced paddles 60 of greater axial extent than the paddles 58 on the upper ends thereof and bevelled paddles 62 on the lower ends thereof. Each pair of adjacent paddles is separated by a pair of slightly axially spaced diametrically enlarged annular flanges 64 extending about the corresponding drum assembly 56 and the spaces 66 between each pair of closely adjacent flanges 54 is registered with a pair of opposite side inclined cutting blades 68 removably supported from the chassis or frame 12 in any convenient manner.

The drum assemblies 56 may be rotated in either direction and the cane 48 falling rearwardly and downwardly toward the drum assemblies 56 is received between adjacent circumferentially spaced sets of paddles 58, 60 and 62 and displaced toward the corresponding set of rearwardly and downwardly inclined blades 68, the cane 48 having leaves 70 thereon. As the cane 48 moving about the axis of rotation of the corresponding drum assembly 56 moves toward the cutting blades received in the spaces 66, the cane 48 and leaves 70 are forced into engagement with and along the blades 68 such that the cane 48 is severed into billets equal in length to the spacing between the spaces 66 while at the same time the portions of the leaves 70 of the cane 48 registered with the spaces 66 are also severed. Thus, not only is the cane 48 cleanly cut at each cutting zone by a single stationary blade along which the cane is moved and advanced, but those portions of the leaves 70 registered with the spaces 66 are also cut, thereby cutting a large majority of the cane leaves from the cane at the same time the cane is cut into billets.

After the cane 48 being cut passes rearwardly from the drum assemblies 56, it contacts a deflector panel 70 on the inlet side of an inclined lug equipped belt conveyor referred to in general by the reference numeral 72 and falls from the bottom of the deflector panel 70 into the lower portion of the belt conveyor 72. The belt conveyor 72 thereafter conveys the cane billets and severed leaf portions upwardly along the belt conveyor 72 toward a downwardly opening outlet 74 thereof comprising a discharge point for the conveyor 72. However, a high air flow fan 76 is provided at the upper end of the belt conveyor 72 and is operative to draw air inwardly through the billets being discharged from the belt conveyor 72 and to discharge air under pressure and separated cut leaf portions downwardly through a discharge chute 78 onto the ground.

Figure 3:
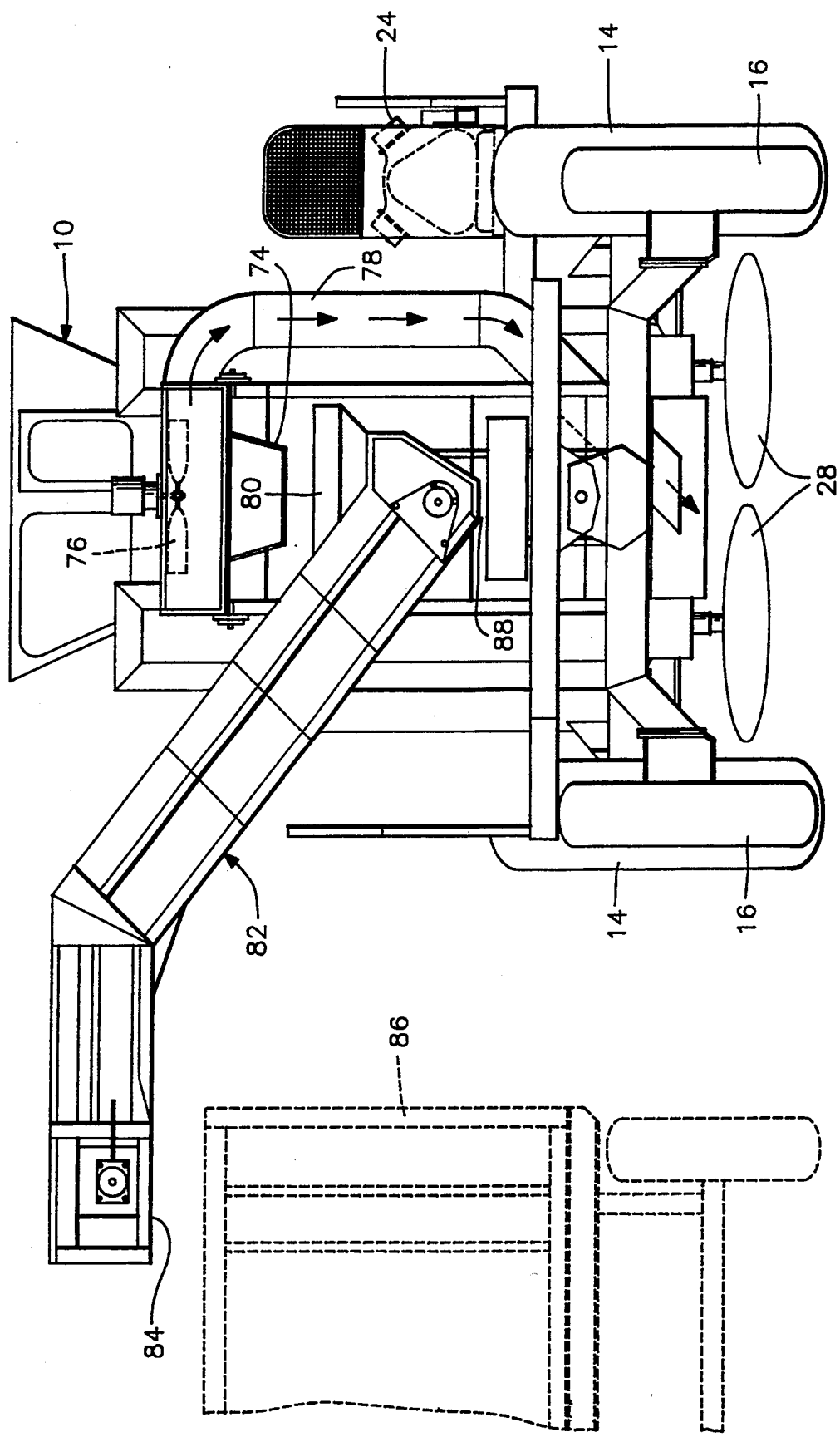
FIG. 3 is a rear elevational view of the cane combine with the discharge conveyor projecting laterally outwardly of the left side of the combine.
Figure 4:
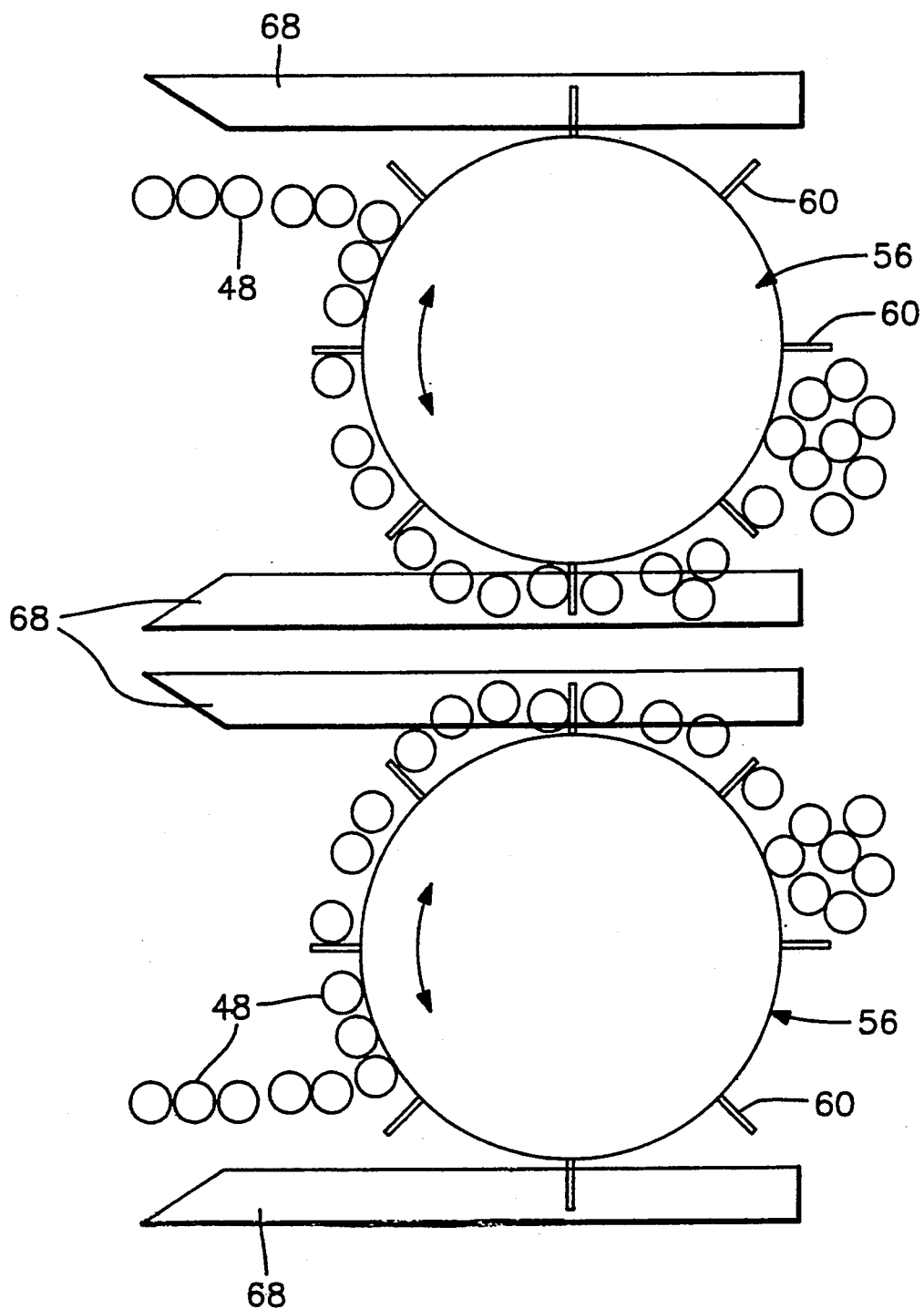
FIG. 4 is a schematic view of the cane billeting and leaf portion removing cutting mechanism of the combine.
Figure 5:
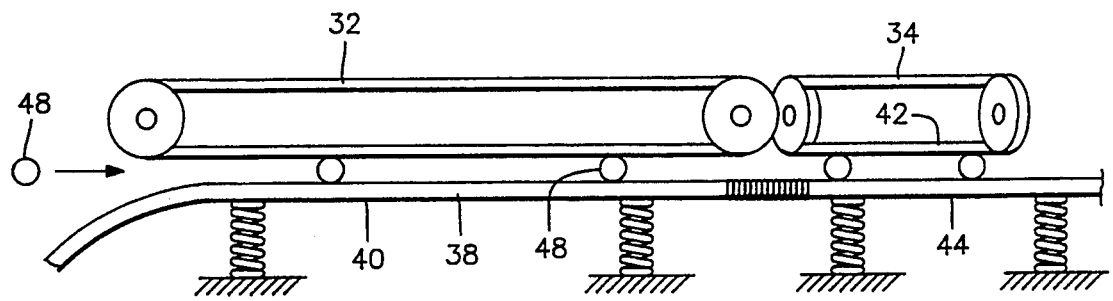
FIG. 5 is a schematic view of the cut cane conveyor assembly for conveying cut cane to the cane billeting and leaf portion removal cutting assembly.
Figure 6:
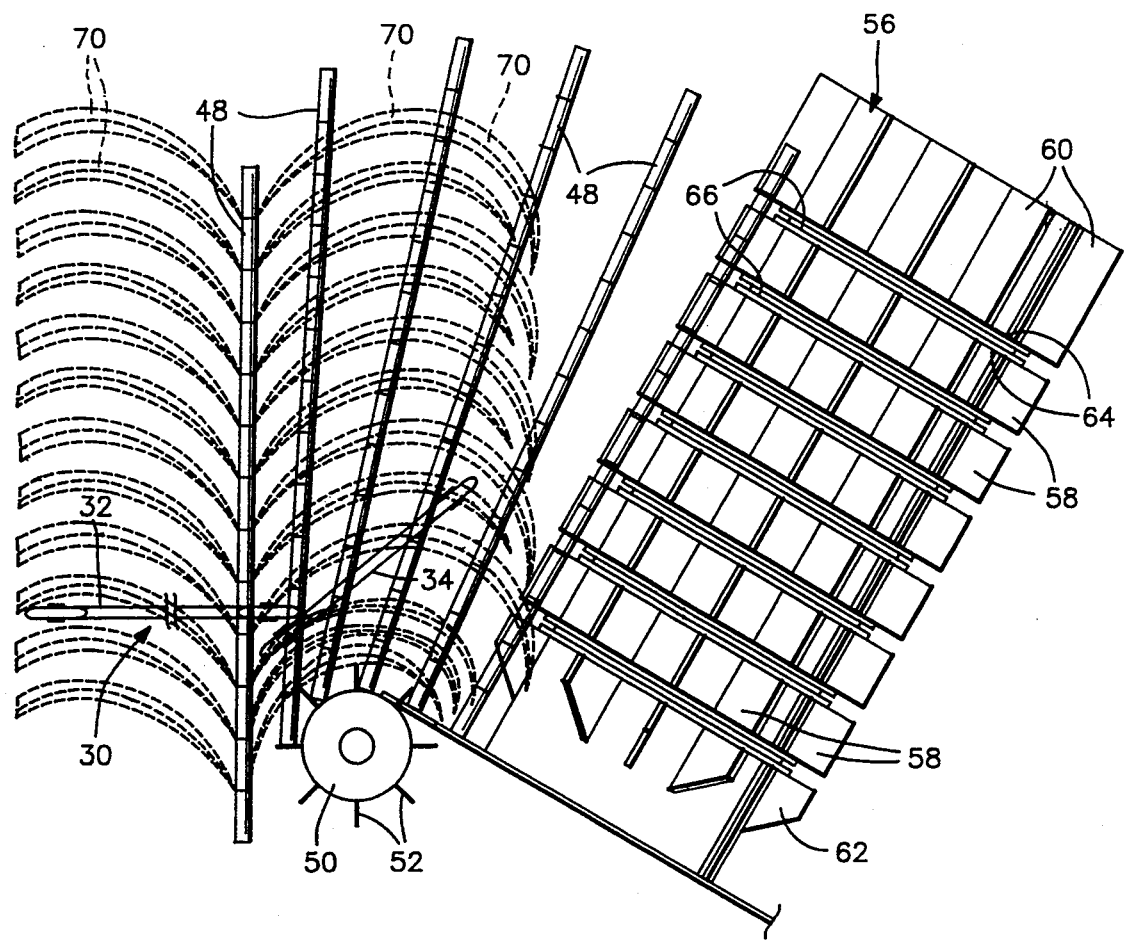
FIG. 6 is a schematic view illustrating the manner in which upright cut cane is conveyed, tilted and discharged by gravity into the cane billeting and leaf portion cutting assembly, typical leaves on only one of the cane stalks being illustrated in phantom lines.

The cut billets are then discharged as at 74 into the inlet hopper 80 of a conveyor assembly 82 disposed below the outlet 74 and the conveyor assembly 82 includes an outlet 84 for discharging cut clean green cane billets (having a majority of the leaf portions thereof severed therefrom) into an attendant transport 86. In FIG. 1 the conveyor assembly 82 is disposed in the nonoperative transport position thereof, but the conveyor assembly 82 is pivotally mounted from the chassis or frame 12 as at 88 and may be swung to laterally projecting operative positions such as those illustrated in FIGS. 2 and 3, the attendant transport 86 being disposed along either side of the combine 10 for receiving cut billets from the conveyor assembly 82 during a harvesting operation.

Inasmuch as the blades 68 are removably supported from the chassis or frame 12, alternate blades 68 may be removed in order to increase the length of the billets into which the cane 48 is to be cut. With all of the blades 68 in place, the cane 48 is cut into billets one-half the length of seeding billets, this procedure being followed when all of the cane being harvested is to be processed into sugar. However, when the cane being harvested is to be used for seeding, alternate blades 68 are removed in order that the cane 48 may be cut into proper length billets for use as seeding billets.

The drum assemblies 56 are enclosed within forwardly and upwardly opening shrouds (not shown) and the lower portions of those shrouds discharged directly into the billet conveyor 72 immediately forward of the deflector panel 70.

The foregoing is considered as illustrative only of the principles of the invention. Further, since numerous modifications and changes readily will occur to those skilled in the art, it is not desired to limit the invention to the exact construction and operation shown and described, and accordingly, all suitable modifications and equivalents may be resorted to, falling within the scope of the invention.

What is claimed as new is as follows

1. A cutter for simultaneously severing sugar cane into short billet lengths and severing a majority of leaf portions from said cane, said cutter including a rotary drum, a plurality of stationary elongated, generally parallel blades disposed in planes generally normal to the axis of rotation of said drum and registered with predetermined circumferential zones of said drum spaced longitudinally thereof, said blades being closely tangential to said drum, said drum including circumferentially spaced flights of radially aligned and outwardly projecting generally radial plane paddles supported from said drum in circumferential areas thereof disposed between said zones.

2. The cutter of claim 1 wherein said drum includes narrow circumferentially extending diametrically enlarged portions disposed closely adjacent opposite sides of each of said zones between adjacent circumferential areas of said drum.

3. The cutter of claim 1 wherein said cane engaging and displacing means includes a plurality of axially spaced sets of generally radially outwardly projecting abutments carried by said drum on opposite sides of at least some of said zones with the projections of said sets of projections aligned longitudinally of said drum.

4. The cutter of claim 3 wherein said projection comprise generally radial plane paddles carried by said drum.

5. The cutter of claim 1 wherein the axis of rotation of said drum is inclined, said cutter including an elongated conveyor spaced beneath and generally paralleling the underside of said drum for receiving cane billets produced by said cutter and conveying the billets upwardly along said conveyor.

6. The cutter of claim 5 including means operative to produce an upward flow of air between said drum and conveyor for blowing separation of cut cane leaf portions from the cane billets moving upwardly along said conveyor.

7. The cutter of claim 6 wherein said cane engaging and displacing means includes a plurality of axially spaced sets of generally radially outwardly projecting abutments carried by said drum on opposite sides of at least some of said zones with the projections of said sets of projections aligned longitudinally of said drum.

8. The cutter of claim 7 wherein said projection comprise generally radial plane paddles carried by said drum.

* * * * *